United States Patent [19]

Tsuchiya

[11] Patent Number: 4,573,090
[45] Date of Patent: Feb. 25, 1986

[54] VIDEO RECORDING/REPRODUCING APPARATUS WITH TAPE SLACK IN BACK-SPACE EDITING MODE

[75] Inventor: Eiichi Tsuchiya, Yokohama, Japan
[73] Assignee: Victor Company of Japan, Ltd., Japan
[21] Appl. No.: 404,395
[22] Filed: Jul. 30, 1982
[30] Foreign Application Priority Data

Aug. 13, 1981 [JP] Japan .................. 56-120469

[51] Int. Cl.⁴ .................................. G11B 15/20
[52] U.S. Cl. ........................ 360/85; 242/199; 360/74.1; 360/95
[58] Field of Search ............ 360/85, 95, 83–84, 360/93, 137, 96.3–96.4, 71, 74.1, 74.3; 242/198–201, 75, 75.1, 75.3

[56] References Cited

U.S. PATENT DOCUMENTS

| | | | |
|---|---|---|---|
| 4,092,684 | 5/1978 | Umeda | 360/85 |
| 4,138,699 | 2/1979 | Ura et al. | 360/95 |
| 4,437,129 | 3/1984 | Yoshida et al. | 360/85 |

OTHER PUBLICATIONS

M. Itoga et al., "New, Entirely Electronically Controlled, Five-Motor, Direct-Drive VCR's", Mitsubishi Elect. Adv., Dec. 1980, vol. 14, pp. 9–12.

Primary Examiner—Stuart N. Hecker
Assistant Examiner—David J. Severin
Attorney, Agent, or Firm—Andrus, Sceales, Starke & Sawall

[57] ABSTRACT

A video signal recording and/or reproducing apparatus comprising a guide drum comprising at least a single video signal recording and/or reproducing head, a supply reel and a take-up reel respectively fitted with a supply reel and a take-up reel of a tape cassette, tape loading mechanism for drawing out a tape from the tape cassette which is loaded and loading the tape unto a predetermined tape path so as to make contact with the guide drum throughout a predetermined range, a capstan rotatable in a forward direction, for causing the tape loaded by the tape loading mechanism in the forward direction along the predetermined tape path, tape feed back mechanism responsive to an interruption of a recording operation, for rotating the capstan in a reverse direction and rotating the supply reel disc in a tape take-up direction, to partially feed back the tape to the supply side along the predetermined tape path, and tape draw-out mechanism for rotating the take-up disc in a tape draw-out direction at a speed greater than a speed with which the tape is fed back by the tape feed back mechanism, during operation of the tape feed back mechanism. A tape slack in the tape path between the take-up reel and the capstan due to the tape drawn out from the take-up reel is fed back to the side of the supply reel.

5 Claims, 4 Drawing Figures

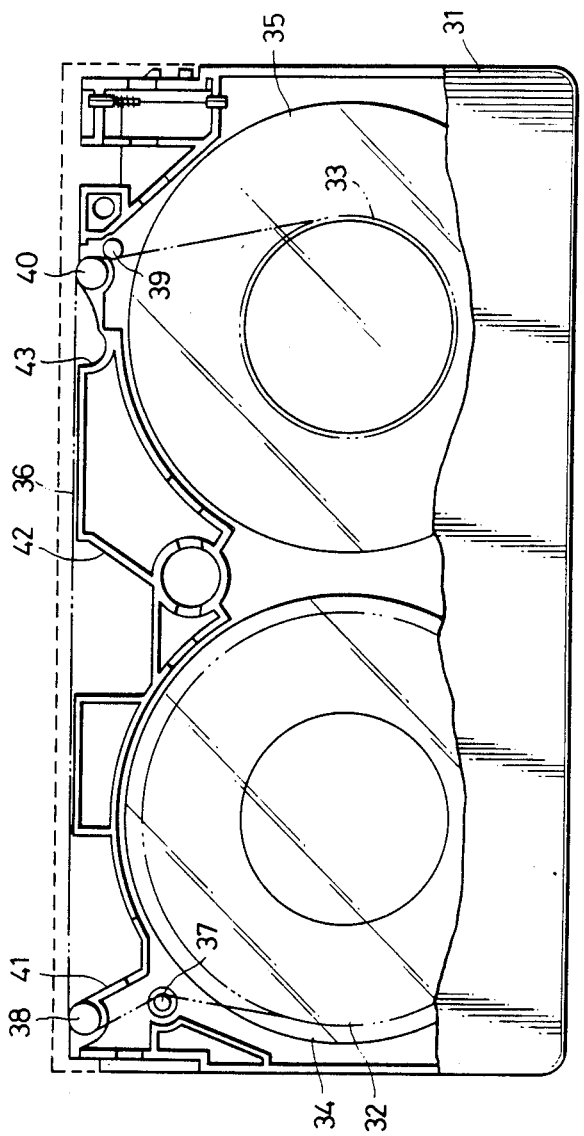

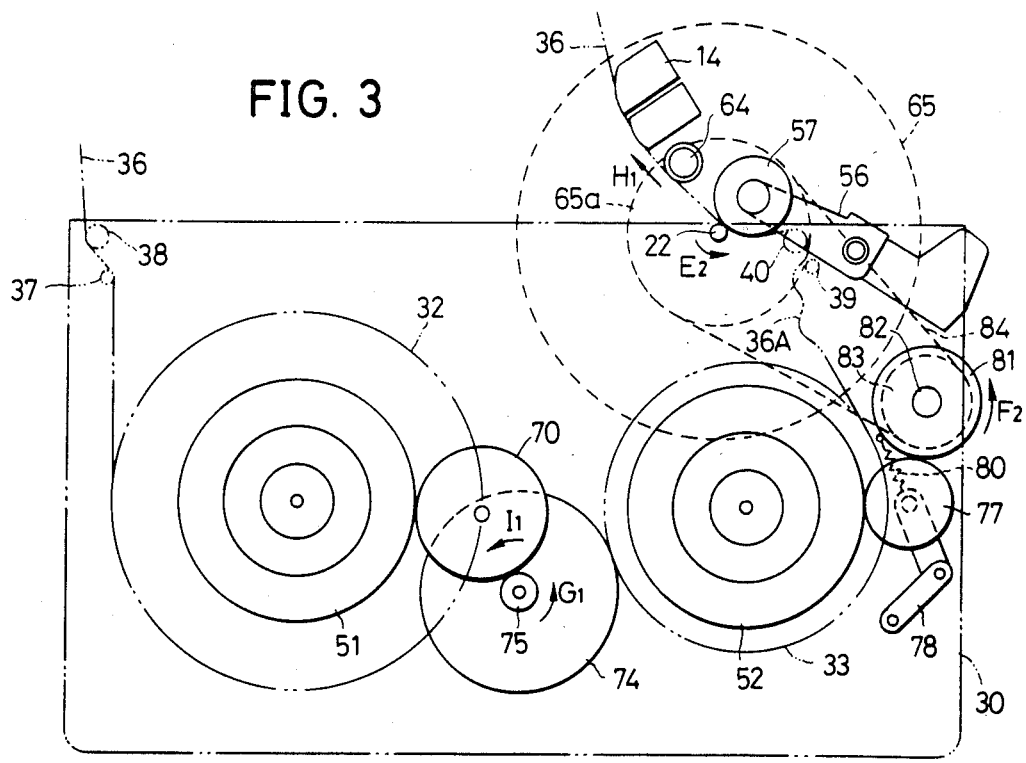
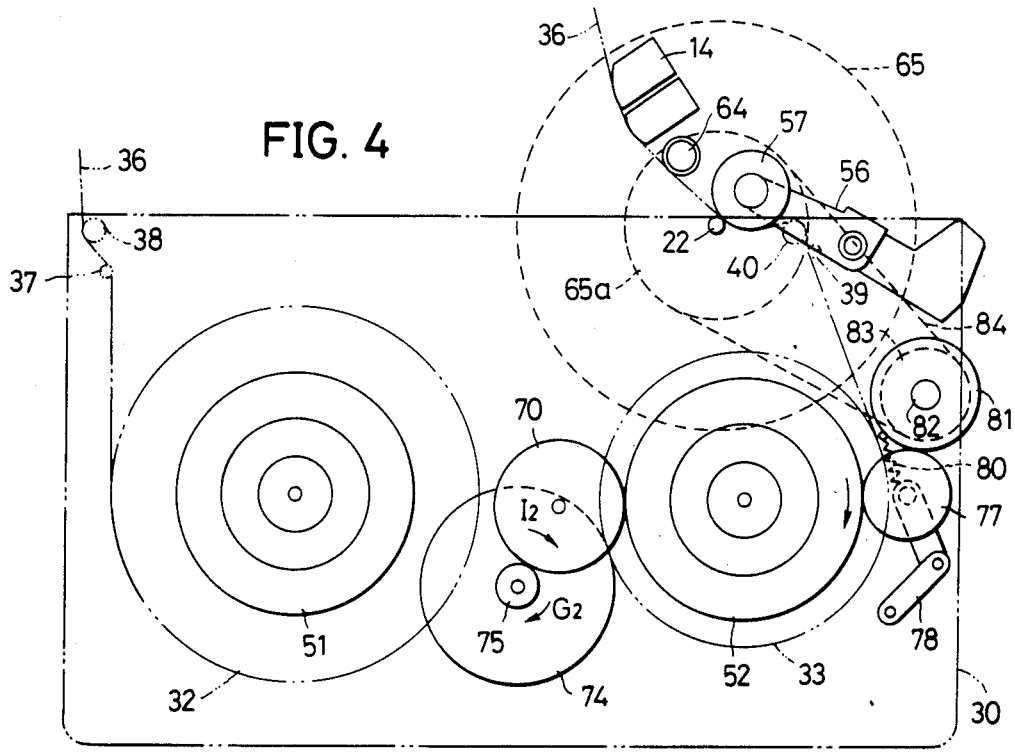

VIDEO RECORDING/REPRODUCING APPARATUS WITH TAPE SLACK IN BACK-SPACE EDITING MODE

BACKGROUND OF THE INVENTION

The present invention generally relates to video signal recording and/or reproducing apparatuses, and more particularly to a video signal recording and/or reproducing apparatus comprising a back-space editing mechanism capable of stably moving a tape to the supply side during a so-called back-space editing operation in which a recording mode is interrupted, the tape is slightly fed back to the supply side, and the tape is caused to travel in a forward direction when the recording mode is resumed thereafter to continue the recording.

Presently, as video tape recorders, an apparatus of a type is popularly used in which a tape cassette is loaded into the apparatus and a tape is drawn out of the tape cassette to be loaded into a predetermined tape path for carrying out recording and reproduction. Most of the video tape recorders of this type are provided with a so-called back-space editing mechanism. By this back-space editing mechanism, the tape is slightly fed back to the supply side upon interruption of the recording mode, and the tape is caused to travel in a forward direction to lock the servo for the length of tape corresponding to the above fed back tape length to put the video tape recorder in a state possible for carrying out recording, to enable the recording to be continued from a point on the tape where the recording mode was interrupted. Conventionally, when returning the tape in a reverse direction by rotating a capstan in the reverse direction in a state where the tape is pinched between a pinch roller and the capstan, the tape was forcibly drawn out from a take-up reel. That is, the tape was drawn out from the take-up reel under tension.

In addition, especially in a video tape recorder in which the capstan is positioned in front of the loaded tape cassette, the tape is once guided by a guide pole provided at a front opening of the tape cassette before reaching the capstan, when observed with respect to a tape path within the tape cassette reaching the capstan from the take-up reel. This guide pole is not a guide pole provided in the video tape recorder, but provided within the tape cassette. Here, the tape cassette is assembled from upper and lower halves. These upper and lower halves are made of resin, molded by die. Thus, the vertical degree of the guide pole is determined by the accuracy in the dimensions of the upper and lower halves, and the assembling accuracy of these upper and lower halves. Accordingly, it is difficult to obtain a constant vertical degree of the guide pole. As a result, in some of the tape cassettes on the market, the guide pole is sloping to a degree exceeding the allowable sloping range. If such a tape cassette in which the guide pole is sloping in excess of the allowable sloping range is used with respect to the video tape recorder, the tape will deviate in the sloping direction of the guide pole when the tape is fed back. Hence, the tape path towards the capstan deviates in the width direction of the tape, that is, in the upward and downward directions. Furthermore, the tape deviates upwards and downwards at the part where the tape is pinched between the capstan and the pinch roller, and the tape path becomes irregular. This caused damage to the tape. In addition, there was a disadvantage in that the back-space editing operation could not be performed smoothly, because the tape travel became unstable upon starting of the back-space editing operation. Moreover, the above described phenomenons also occurred when the tape cassette was erroneously loaded in a sloping manner.

SUMMARY OF THE INVENTION

Accordingly, it is a general object of the present invention to provide a novel and useful video signal recording and/or reproducing apparatus in which the above described disadvantages have been overcome.

Another and more specific object of the present invention is to provide a video signal recording and/or reproducing apparatus provided with a mechanism for rotating a take-up reel disc in a tape feed out direction at a speed greater than a speed with which a tape is fed back, when the tape is fed back towards a supply reel by a pause operation for interrupting a recording mode. According to the apparatus of the present invention, the tape feed back operation is performed in a state where there is slack in the tape within a tape path between the take-up reel disc and the capstan. Thus, even if a guide pole provided within the tape cassette at a position in front of the capstan with respect to the tape feed back direction is sloping due to poor accuracy in the tape cassette itself, inconsistent loading state of the tape cassette, and the like, the tape is not affected by the guide pole which is sloping. Therefore, the tape is positively guided by the guide pole, and the operation to feed back the tape by the capstan can be performed stably without damaging the tape. In addition, the tape stably travels from the start of the tape travel in the forward direction, to permit stable back-space editing.

Other objects and further features of the present invention will be apparent from the following detailed description when read in conjunction with the accompanying drawings.

BRIEF DESCRIPTION OF THE DRAWINGS

FIG. 2 is a plan view showing an inner construction of a tape cassette which is loaded with respect to the apparatus shown in FIG. 1, with a part of an upper half cut away;

FIG. 3 is a diagram showing an operational state of peripheral parts of a take-up reel disc in the apparatus shown in FIG. 1, when a tape is fed back towards the supply side upon back-space editing; and FIG. 4 is a diagram showing an operational state of peripheral parts of the take-up reel disc, in a state where slack in the tape at the take-up reel is taken up in continuation with the operation in which the tape is fed back.

DETAILED DESCRIPTION

Figure 1:
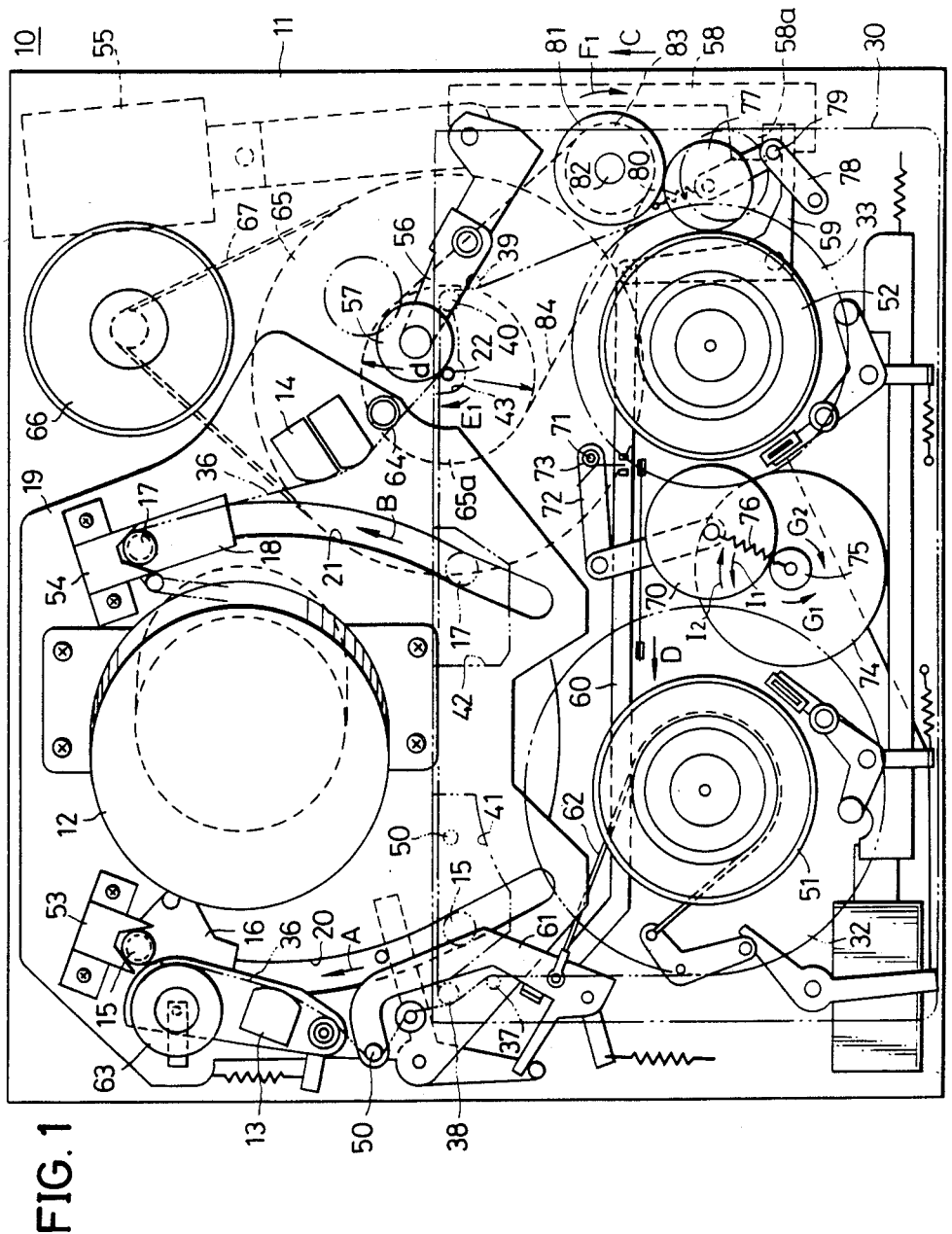
FIG. 1 is a plan view showing a first embodiment of a video signal recording and/or reproducing apparatus according to the present invention in a recording or reproducing mode.

In FIG. 1, a recording and/or reproducing apparatus 10 has a main chassis 11. A guide drum 12 comprising an upper rotary drum having video heads and a lower stationary drum, a full-width erasing head 13, an audio control head 14, and the like, are provided on the main chassis 11. A loading pole 15 is provided on a sliding mount 16, while a loading pole 17 is provided on another sliding mount 18. These loading poles 15 and 17 are respectively moved along guide grooves 20 and 21 formed in a sub chassis 19, by a known tape loading mechanism (not shown) using rings. A capstan 22 is provided at an edge of a tape cassette loading part.

As shown in FIG. 2, a tape cassette 30 accommodates a supply reel 34 and a take-up reel 35 respectively having tape rolls 32 and 33, within a cassette case 31. In the cassette case 31, a magnetic tape 36 is guided by guide poles 37 and 38 with respect to the side of the supply reel 34, and is guided by guide poles 39 and 40 with respect to the side of the take-up reel 35. The magnetic tape 36 forms a tape path along the front of the tape cassette 30. In addition, depressions 41 and 42 for receiving loading poles and a depression 43 for receiving capstan, are respectively formed at the front of the cassette case 31. The depression 43 is particular is formed adjacent to the guide pole 40.

The above tape cassette 30 is loaded into a loading part of the apparatus 10 as indicated by a two-dot chain line in FIG. 1. Accordingly, the loading pole 15 and a tension pole 50 relatively enter within the depression 41, the loading pole relatively enters within the depression 42, and the capstan 22 relatively enters within the depression 43. In addition, the supply reel 34 and the take-up reel 35 respectively fit over a supply reel disc 51 and a take-up reel disc 52.

When a recording or reproducing operation is performed, a loading mechanism (not shown) operates. Hence, the loading poles 15 and 17 respectively move along the guide grooves 21 and 21 in directions of arrows A and B, to final positions engaging with stoppers 53 and 54, to draw the tape 36 outside the cassette case 31. A plunger 55 is energized to angularly rotate a pinch roller arm 56 counterclockwise, and a pinch roller 57 accordingly presses against the capstan 22. Moreoever, because the plunger 55 is energized, a slide plate 58 is drawn in the direction of an arrow C, and a slide plate 60 is moved in the direction of an arrow D by means of an L-shaped rotary lever 59. Hence, a tension arm 61 angularly rotates counterclockwise to a position shown in FIG. 1, and tension is introduced in a brake band 62.

When the tape loading operation is completed, the apparatus 10 is put into a recording or reproducing mode. In this mode, the tape 36 is drawn out from the tape roll 32, makes contact with an impedance roller 63 after making contact with the tension pole 50 and the erasing head 13. The tape 36 is further guided by the loading pole 15, and changed of its direction to be wound around the guide drum 12 is a spiral manner. A video signal is recorded onto or reproduced from the tape 36 making contact with the guide drum 12.

After making contact with the guide drum 12, the tape 36 is changed of its direction by being guided by the loading pole 17. Hence, the tape 36 makes contact with the audio control head 14 and a guide roller 64. Thereafter, the tape 36 is pinched between the pinch roller 57 and the capstan 22, and driven to enter within the tape cassette 30. Accordingly, the tape 36 is finally taken up to the tape roll 33.

The above capstan 22 is provided on a flywheel 65, and is rotated in the direction of an arrow E1 by a motor 66 by way of a belt 67.

With respect to a reel driving mechanism, an idler 70 is provided at a position between the reel discs 51 and 52 closer to the take-up reel disc 52 as shown in FIG. 1, however, the idler 70 is maintained at a position not making contact with the take-up reel disc 52. One end of the idler 70 is axially supported by a pin 71. The idler 70 is provided at a tip end of an arm mechanism 72 which can be bent, and is built-in with a clutch mechanism for giving the necessary axial load for the swinging operation of the idler. The idler 70 makes contact with a driving roller 75 of a motor 74, by the action of a torsion spring 73 and a spring 76. During the recording and reproducing mode, the slide plate 60 slides in the direction of an arrow D, and the spring force in the torsion spring 73 is zero. The idler 70 is drawn towards the driving roller 75 by the action of the spring 76, and is stably maintained at the above position.

An idler 77 for recording and reproduction, is supported by an arm mechanism 78, and is provided on the right side of the take-up reel disc 52 in FIG. 1. During a stop mode, a pin 79 engages with an engaging arm part 58a of the slide plate 58, and the idler 77 is at a position indicated by a two-dot chain line in FIG. 1, separated from the take-up reel disc 52. On the other hand, during the recording and reproducing mode, the slide plate 58 is moved in the direction of the arrow C. Accordingly, in this mode, the idler 77 moves by being pulled by a coil spring 80, and presses against the take-up reel disc 52 and a roller 81. This roller 81 is fixed at an upper part of a vertical rotary shaft 82. A belt 84 is stretched across between a roller 83 at a lower part of the rotary shaft 82 and a stepped wheel part 65a of the flywheel 65. During the above recording and reproducing mode, the roller 81 is rotated in the direction of an arrow F1 by the flywheel 65, by way of the belt 84. Furthermore, the take-up reel disc 52 is rotated clockwise by way of the idler 77. Thus, the tape 36 fed out from a tape pinching and driving part consisting of the capstan 22 and the pinch roller 57, is taken up by the tape roll 33. Here, a diameter d of the stepped wheel part 65a is determined so as to give a rotational speed greater than the above feeding speed of the tape 36 to the take-up reel disc 52, even if the diameter of the tape roll 33 is minimum and the tape take-up speed is minimum. Therefore, the take-up reel disc 52 rotates accompanying the sliding movement of a sliding clutch which is built-in with the take-up reel disc 52. As a result, the tape 36 is guided by the guide poles 40 and 39 within the tape cassette 30 under tension, and becomes taken up by the tape roll 33.

Next, the description will be given with respect to the operation of the tape travel system for a case where a back-space editing is carried out during the recording mode, by referring to FIGS. 3 and 4.

FIGS. 3 and 4 respectively show peripheral parts of the take-up reel disc 52 upon back-space editing, in a state where the tape is fed in the reverse direction, and in a state where the feeding of the tape in the reverse direction is completed.

The back-space editing operation is carried out by performing a pause operation during the recording mode, and cancelling the pause state when resuming the recording operation.

If the pause operation is carried out during the recording mode, the plunger 55 remains energized. Hence, the pinch roller 57 and the idler 77 remain as they are. Moreover, the capstan motor 66 rotates in the reverse direction, and the motor 74 rotates in the direction of an arrow G1.

As shown in FIG. 3, the capstan 22 rotates in the direction of an arrow E2 due to the rotation of the capstan motor 66 in the reverse direction. Thus, the tape 36 is fed out in the direction of an arrow H1, and is fed back towards the side of the supply reel. The length of tape which is fed back, is controlled by a signal detected by the head 64, and as a result, the motor 66 stops if a predetermined length of the tape 36 is fed back. In addition, due to the above rotation of the motor 74, the idler 70 swings in the direction of an arrow I1 to reach a position pressing against the supply reel disc 51. Accordingly, the rotational movement of the driving roller 75 is transmitted to the supply reel disc 51, to rotate the supply reel disc 51 counterclockwise. As the supply reel disc 51 rotates, the tape 36 which is fed out in the direction of the arrow H1 by the capstan 22 and the pinch roller 57, becomes taken up by the tape roll 32.

During the above described operation, the tape path between the tape roll 33 and the capstan 22 becomes as described hereinafter. That is, because the capstan 22 is rotated in the direction of the arrow E2, the roller 81 is rotated in the direction of an arrow F2 by means of the belt 84. On the other hand, the take-up reel disc 52 is rotated counterclockwise by way of the idler 77, that is, in the direction so as to feed out the tape. The take-up reel disc 52 is rotated so that the speed with which the tape is drawn out is greater than the speed with which the tape is fed out by the capstan 22. Accordingly, within the tape cassette 30, the tape 36 in the tape path reaching the capstan 22 from the tape roll 33 has a slack as indicated by 36a in FIG. 3. Hence, the capstan 22 feeds out the tape having the slack within the tape cassette 30 in the direction of the arrow H1, instead of directly feeding out from the tape roll 33 on the side of the take-up reel. Therefore, the tension in the tape at the front of the capstan 22 along the tape traveling direction becomes extremely small. Thus, the tape 36 only lightly makes contact with respect to the guide pole 40 (at a position immediately in front of the capstan 22 along the tape traveling direction). That is, the tape 36 is drawn out of the tape cassette 30 in a state only making contact with the guide pole 40.

Accordingly, even if the parallel degree of the guide pole 40 with respect to the capstan 22 is poor and the guide pole 40 is sloping, the tape 36 reaches the capstan 22 without being affected by the guide pole 40, that is, without deviating in the sloping direction of the guide pole 40. Hence, the tape 36 passes by the tape pinching and driving part without deviating in the direction of the tape width. The above slack 36a introduced in the tape 36 is maintained at a position between the upper and lower flanges of the take-up reel 35.

Thus, even in a case where a tape cassette having poor dimension accuracy is used or the tape cassette 30 is loaded into the apparatus 10 in a sloping manner, the tape 36 at the capstan 22 is not affected by the guide pole 40 and does not deviate in the direction of the tape width. Hence, the tape 36 is stably pinched and driven, to be fed out in the direction of the arrow H1. As a result, the operation to feed back the tape 36 to the supply reel from the take-up reel is carried out smoothly, without accompanying deviation in the tape path along the height direction thereof. In addition, because the length of tape corresponding to the above slack in the tape is fed out during the above tape feed out operation, the load on the motor becomes small, to allow the tape to be fed out smoothly.

The take-up reel disc 52 is rotated in the direction for drawing out the tape, by using the rotation of the capstan 22. Accordingly, it is unnecessary to provide a motor exclusively for rotating the take-up reel disc 52 in the direction for drawing out the tape. This simplifies the construction of the apparatus 10. Furthermore, the ratio between the tape feed-out speed at the capstan part and the tape draw-out speed from the tape roll 33 can be appropriately determined.

In a case where there is tension in the tape path reaching the capstan 22 from the tape roll 33 on the take-up side, the tension in the tape guided by the guide pole 40 and reaching the capstan 22 differs along the direction of the tape width if the guide pole 40 is sloping. In such a case, the tape will deviate in the direction of the tape width as the tape passes by the tape pinching and driving part. For example, the upper and lower edges of the tape may be pushed against the upper and lower flanges of the guide roller 64 and bent.

When the predetermined length of the tape 36 is fed back to the side of the supply reel after carrying out the pause operation, the capstan motor 66 stops, and the motor 74 is rotated in the reverse direction, that is, in the direction of an arrow G2.

As the capstan motor 66 stops rotating, the feeding of the tape 36 to the side of the supply reel is stopped. However, if the tape 36 is left in this state, the slack in the tape 36 will remain between the capstan 22 and the tape roll 33 on the take-up side. Thus, it becomes necessary to take-up this slack. When the motor 74 rotates in the direction of the arrow G2, the idler 70 swings in the direction of the arrow I2 as shown in FIG. 4, and assumes a state making contact with the take-up reel disc 52. Thus, the rotation of the driving roller 75 is continuously transmitted, to rotate the take-up reel disc 52 clockwise. As the take-up reel disc 52 rotates, the slack in the tape at the side of the tape roll 33 becomes taken up by the tape roll 33, and the slack in the tape is accordingly eliminated. As a result, tension is introduced in the tape path reaching the tape roll 33 from the capstan 22, and the tape 36 is guided by the guide poles 40 and 39. The motor 74 thereafter stops rotating.

When the take-up reel disc 52 rotates in the tape take-up direction, a force acts on the idler 77 along a direction so as to reduce the pressing force exerted by the idler 77 with respect to the take-up reel disc 52. Hence, the above rotational movement of the take-up reel disc 52 is not transmitted to the roller 81. Accordingly, the tape take-up operation is performed by the take-up reel disc 52 in a state where the capstan 22 is stopped so as not to rotate unnecessarily.

If the pause operation is cancelled thereafter to resume the recording mode, the capstan motor 66 starts to rotate the capstan 22 in the direction of the arrow E1. Thus, the tape 36 begins to travel in the forward direction. The recording operation is started at a point when the tape traveling speed reaches a predetermined tape speed. When the tape 36 begins to travel in the forward direction, the tape travels smoothly in the forward direction from the starting point, because there is no irregularity in the vicinity of the capstan 22. This permits the back-space editing operation to be performed stably.

In the above described embodiment of the invention, the operation to partially feed back the tape towards the supply side is performed by rotating the capstan 22. Hence, fine response can be obtained, and it becomes possible to carry out the back-space editing even if the interruption time in which the recording is interrupted is short. Furthermore, inconsistency is prevented from being introduced at the parts where the recording is interrupted.

Further, the present invention is not limited to these embodiments, but various variations and modifications may be made without departing from the scope of the present invention.

What we claim is:

1. A video signal recording and/or reproducing apparatus comprising:
   a guide drum;
   a supply reel disc and a take-up reel disc respectively fitted with a supply reel and a take-up reel of 9 tape cassette;
   tape loading means for drawing out a tape from said tape cassette which is loaded into said apparatus and for loading the tape into a predetermined tape path so as to make contact with said guide drum throughout a predetermined range;
   a capstan rotatable in a forward direction for causing said tape loaded by said tape loading means to move in the forward direction along the predetermined tape path;
   tape feed back means responsive to an interruption of a recording operation for rotating said capstan in a reverse direction and for rotating said supply reel disc in a tape retracting direction, to partially feed back said tape to said supply reel disc along the predetermined tape path for a period of time short enough to prevent interfering tape slack build-up; and
   tape feed-out means for rotating said take-up reel disc in a tape feed-back direction at a speed greater than a speed with which said tape is fed back by said tape feed back means during operation of said tape feed back means, so that the tape is fed back to said supply reel maintaining a slack of the tape in a tape path formed between said take-up reel and said capstan due to the tape fed out of said take-up reel.

2. An apparatus as claimed in claim 1 in which said tape feed-out means is an idler mechanism rotated due to the rotation transmitted from said capstan, and said idler mechanism presses against said take-up reel disc.

3. An apparatus as claimed in claim 2 in which said idler mechanism comprises a roller rotated by being transmitted of the rotation of said capstan, and an idler pressing against said roller and said take-up reel disc during the recording mode, said take-up reel disc being rotated in the tape take-up direction during the recording mode.

4. An apparatus as claimed in claim 3 in which said idler is arranged and provided at a position such that said idler separates from said take-up reel disc when said take-up reel disc rotates in the tape take-up direction.

5. An apparatus as claimed in claim 1 which further comprises tape slack take-up means operating continuously with the completion of the operation of said tape feed back means, for rotating said take-up reel disc in the tape take-up direction so as to take-up the tape slack in the tape path between said take-up reel and said capstan.

* * * * *